(12) United States Patent
Nakamura et al.

(10) Patent No.: US 9,381,817 B2
(45) Date of Patent: Jul. 5, 2016

(54) RESISTANCE CONNECTING DEVICE

(71) Applicant: TOYODA GOSEI CO., LTD., Kiyosu-shi, Aichi-ken (JP)

(72) Inventors: Yoshiki Nakamura, Kiyosu (JP); Takaki Fukuyama, Kiyosu (JP); Yoshiaki Kameda, Kiyosu (JP)

(73) Assignee: TOYOTA GOSEI CO., LTD., Aichi-pref. (JP)

( * ) Notice: Subject to any disclaimer, the term of this patent is extended or adjusted under 35 U.S.C. 154(b) by 398 days.

(21) Appl. No.: 13/938,389

(22) Filed: Jul. 10, 2013

(65) Prior Publication Data

US 2014/0062185 A1 Mar. 6, 2014

(30) Foreign Application Priority Data

Aug. 31, 2012 (JP) .................................. 2012-190876

(51) Int. Cl.
*B60L 3/04* (2006.01)
*B60L 3/00* (2006.01)
*H01H 39/00* (2006.01)

(52) U.S. Cl.
CPC ................. *B60L 3/04* (2013.01); *B60L 3/0007* (2013.01); *H01H 39/002* (2013.01)

(58) Field of Classification Search
CPC ........ B60L 3/04; B60L 3/0007; H01H 39/002
USPC ....................................................... 307/10.1
See application file for complete search history.

(56) References Cited

U.S. PATENT DOCUMENTS

| 8,432,246 B2* | 4/2013 | Suzuki ..................... H01H 9/12 200/61.08 |
| 8,723,356 B2* | 5/2014 | Fukuyama ............ B60L 3/0007 307/9.1 |
| 2002/0018331 A1 | 2/2002 | Takahashi |
| 2004/0206615 A1 | 10/2004 | Aisenbrey |

(Continued)

FOREIGN PATENT DOCUMENTS

| CN | 1551263 A | 12/2004 |
| CN | 1826676 A | 8/2006 |

(Continued)

OTHER PUBLICATIONS

Office Action mailed May 19, 2015 in the corresponding JP application No. 2012-190876.

(Continued)

*Primary Examiner* — Hal Kaplan
(74) *Attorney, Agent, or Firm* — Posz Law Group, PLC

(57) ABSTRACT

A resistance connecting device includes a case inside of which a chamber is formed. The chamber includes inside an activating unit, a gas generating unit, a first connecting portion, and a second connecting portion. The first connecting portion and the second connecting portion extend from the inside to the outside of the case in a mutually separated state and are exposed in the chamber. The activating unit is held at a first position that does not cause contact with either of the connecting portions when the gas generating unit has not been activated and moves up to a second position to cause contact with both of the connecting portions as a result of activation of the gas generating unit. The activating unit, at the second position, functions as a resistor having a predetermined electrical resistance, and connects the connecting portions to one another.

12 Claims, 3 Drawing Sheets

(56) References Cited

U.S. PATENT DOCUMENTS

2004/0239471 A1 12/2004 Lenk et al.
2010/0328014 A1 12/2010 Suzuki et al.
2012/0062029 A1 3/2012 Fukuyama et al.

FOREIGN PATENT DOCUMENTS

| CN | 101937795 A | 1/2011 |
|---|---|---|
| JP | 10-269002 A | 10/1998 |
| JP | 2007-181308 A | 7/2007 |
| JP | 2012-061934 A | 3/2012 |

OTHER PUBLICATIONS

Office Action mailed Mar. 31, 2015 in corresponding CN application No. 201310354301.X (English translation included).
Office Action issued Mar. 16, 2016 in the corresponding CN application No. 201310354301.X (with English translation).

* cited by examiner

RESISTANCE CONNECTING DEVICE

BACKGROUND OF THE INVENTION

The present invention relates to a resistance connecting device which, under a specific situation, forcibly connects a device serving as an electrical resistance to an electrical circuit.

Recently, various devices formed of electrical circuits, such as control devices that control activation of electric motors, have been proposed and put into practical use. Japanese Laid-Open Patent Publication No. 2007-181308 discloses a device that includes an electrical circuit including a capacitor. This device, at the time of abnormality, forcibly stops an electric power supply to the electrical circuit and connects, to the electrical circuit, a resistor or a device functioning as a resistor for forcibly discharging charge accumulated in the capacitor.

The device disclosed in Japanese Laid-Open Patent Publication No. 2007-181308 has an electrical circuit for driving an electric motor for driving a vehicle. When a collision of a vehicle is detected, a connection of a storage battery for supplying electric power and the electrical circuit is cut off, and the electrical circuit is connected to a horn and headlights. Therefore, at the time of a collision of the vehicle, the electric power supply to the electrical circuit is cut off. Along therewith, charge accumulated in the capacitor of the electrical circuit is consumed by the horn and headlights to be discharged.

In the above-described device, at the time of abnormality, a device functioning as a resistor is connected to the electrical circuit. However, the above-described device is composed of a plurality of electrical devices, such as a device functioning as a resistor and a switch to connect the resistor to the electrical circuit. Therefore, the device structure is complicated, and of the ability to mount the device is also poor.

SUMMARY OF THE INVENTION

It is an object of the present invention to provide a resistance connecting device with a simple structure.

One aspect of the present invention is a resistance connecting device comprising a case inside of which a chamber is formed, a movable member that is movable in the chamber, a gas generating unit provided on a back side of the movable member within the movable chamber, wherein the gas generating unit is activated, as a result of an external signal, to generate gas, and a pair of external connecting portions that extend from the inside to the outside of the case in a mutually separated state. The external connecting portions are located at different positions and are respectively exposed on the front side of the chamber. The movable member is held at a first position in which the movable member is out of contact with at least one of the external connecting portions when the gas generating unit has not been activated and moves to a second position to make contact with both of the external connecting portions as a result of activation of the gas generating unit. The movable member, at the second position, functions as a resistor having a predetermined electrical resistance and connects the external connecting portions to one another.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, an embodiment of a resistance connecting device of the present invention will be described with reference to FIG. 1 to FIG. 4.

Figure 1:
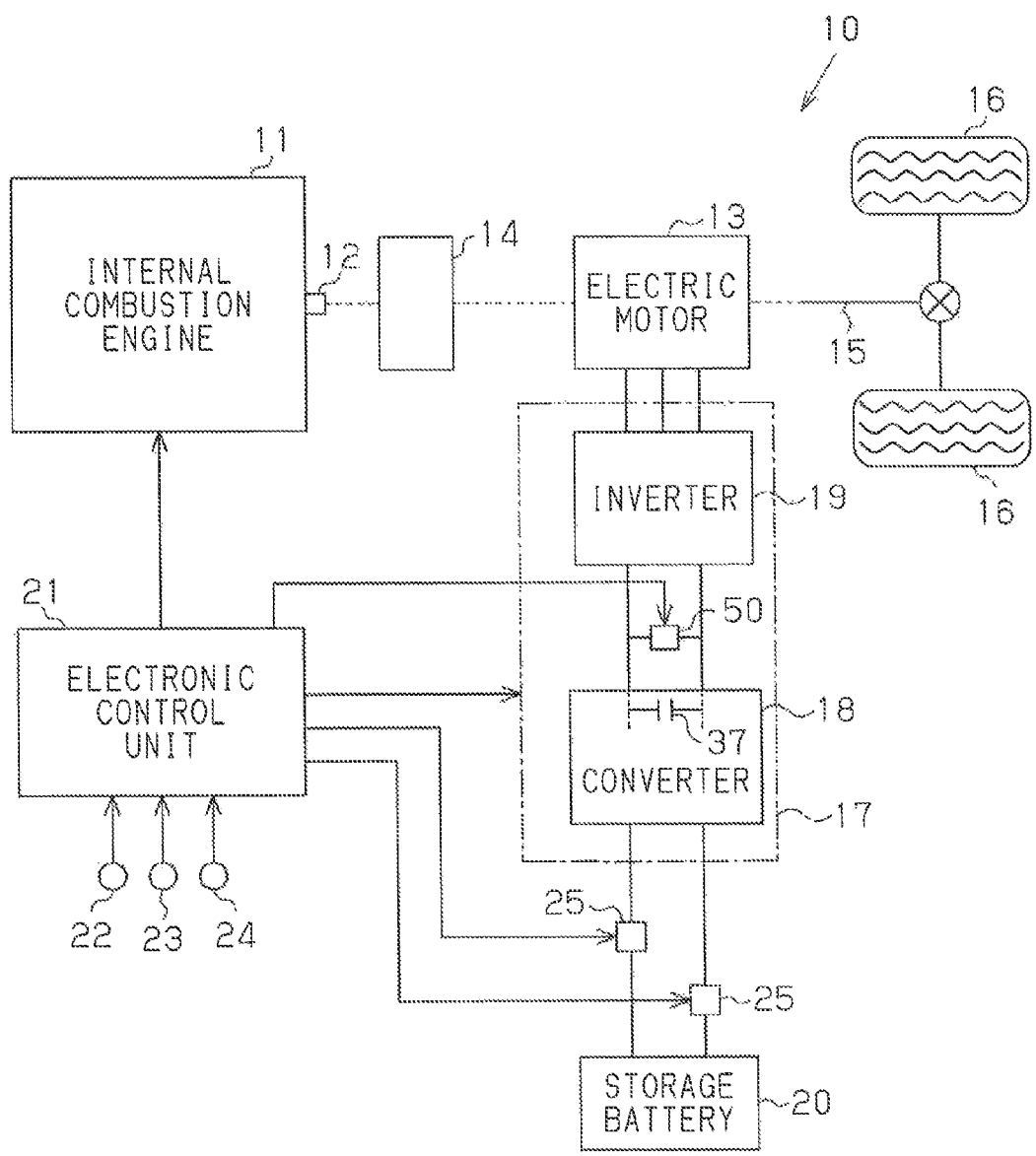
FIG. 1 is a block diagram showing a schematic configuration of a vehicle applied with a resistance connecting device according to an embodiment of the present invention.

As shown in FIG. 1, a vehicle 10 is mounted with an internal combustion engine 11. An output shaft 12 of the internal combustion engine 11 is connected to an axle 15 via an electric motor 13, a power transmission mechanism 14, etc. To the axle 15, drive wheels 16 are connected. The power transmission mechanism 14 is composed of a planetary gear mechanism etc. The power transmission mechanism 14 transmits a rotation torque of the output shaft 12 of the internal combustion engine 11 and a rotation torque of the electric motor 13 to the axle 15. The internal combustion engine 11 and the electric motor 13 function as vehicle driving sources that generate rotation torques to be applied to the axle 15. For the electric motor 13, a three-phase alternating-current rotating machine is employed.

The vehicle 10 is provided with a drive unit 17 for driving the electric motor 13. The drive unit 17 includes a converter 18 and an inverter 19. The converter 18 outputs an electric power input from a storage battery 20 to the inverter 19 after boosting. The inverter 19 outputs an input direct-current power to the electric motor 13 after converting to an alternate-current power suitable for driving the electric motor 13.

The vehicle 10 is provided with an electronic control unit 21 that is configured centered on a microcomputer. Into the electronic control unit 21, output signals of various sensors are acquired. As the various sensors, an accelerator sensor 22, a speed sensor 23, a collision sensor 24, etc., are provided. The accelerator sensor 22 detects a step-on amount of an accelerator pedal (not shown). The speed sensor 23 detects a traveling speed of the vehicle 10. The collision sensor 24 detects an abnormality of the vehicle 10, specifically, whether there is a collision.

The electronic control unit 21 acquires output signals from the above-described respective sensors and performs various arithmetic operations based on those output signals. The electronic control unit 21, based on the arithmetic operation results, carries out activation control of the internal combustion engine 1, activation control of the converter 18, activation control of the inverter 19, etc.

The above-described various types of control relating to operation of the vehicle 10 are basically carried out as in the following.

At the start or during light-load travel of the vehicle 10, if the vehicle 10 is traveled by a torque generated by the internal combustion engine 11, the operating efficiency of the internal combustion engine 11 is low. Under such a situation, the electric motor 13 is driven by an electric power supply from the storage battery 20, and the vehicle 10 travels based on a torque generated by the electric motor 13. On the other hand, under a situation that the internal combustion engine 11 can be operated at a high efficiency, such as during a constant travel of the vehicle 10, the vehicle 10 travels based on a torque generated by the internal combustion engine 11. Moreover, under a situation that a large torque is required, such as during accelerated travel of the vehicle 10, the internal combustion engine 11 is operated, and the electric motor 13 is also driven by an electric power supply from the storage battery 20. In this way, the vehicle 10 travels based on torque generated by both of the internal combustion engine 11 and the electric motor 13.

Figure 2:
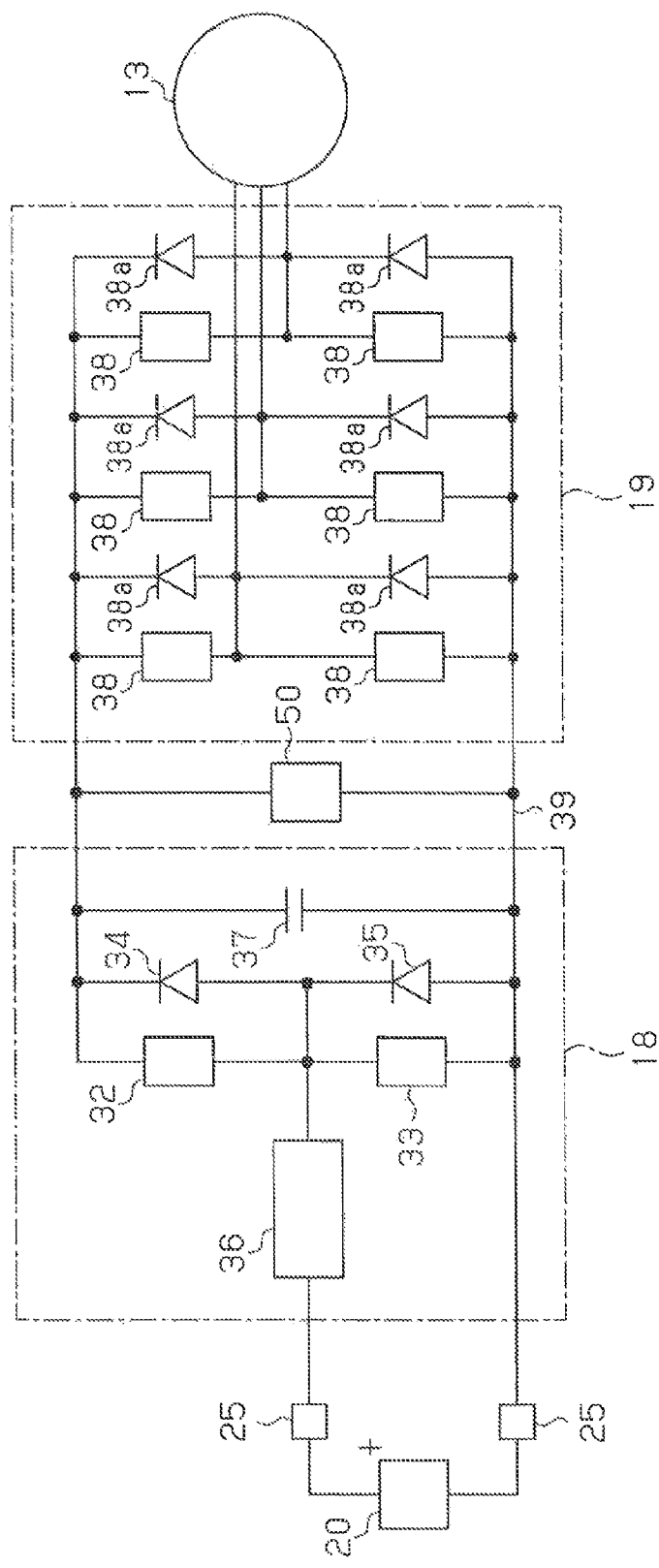
FIG. 2 is a circuit diagram of an electrical circuit.

FIG. 2 shows an electrical circuit consisting of the electric motor 13, the drive unit 17, and the storage battery 20. As shown in FIG. 2, the storage battery 20 is connected to the converter 18. The converter 18 includes two switching elements connected in series, specifically, insulated gate bipolar transistors 32, 33. To each of the switching elements 32, 33, diodes 34, 35 are connected one each. The diodes 34, 35 are connected in parallel with the switching elements 32, 33. A voltage of the storage battery 20, for example, a 200V voltage, is applied to one of the switching elements 32, 33, specifically, between the drain terminal and source terminal of the switching element 33. A positive electrode of the storage battery 20 and the switching element 33 (drain terminal) are connected to each other via a reactor 36. Moreover, between the terminals of the switching elements 32, 33 connected in series, specifically, between the drain terminal of the switching element 32 and the source terminal of the switching element 33, a capacitor 37 is connected.

In the converter 18, activation of the switching elements 32, 33 is controlled. Accordingly, a voltage higher than a power supply voltage of the storage battery 20, for example, a 650V voltage, is output between both terminals of the switching elements 32, 33 connected in series, using characteristics of the reactor 36. Variation in output voltage of the converter 18 is suppressed by the capacitor 37. The circuit consisting of the switching elements 32, 33, the diodes 34, 35, the reactor 36, and the capacitor 37 functions as a converter circuit.

The output voltage of the converter 18 is input to the inverter 19. The inverter 19 includes a three-phase bridge rectifier circuit composed of six switching elements, specifically, insulated gate bipolar transistors 38. The inverter 19 is connected to the electric motor 13. To each of the switching elements 38, diodes 38a are connected one each. The diodes 38a are connected in parallel with respect to the switching elements 38.

In the inverter 19, activation of the respective switching elements 38 is controlled. Accordingly, a direct-current power input from the converter 18 is supplied to the electric motor 13 after being converted to an alternating-current power suitable for driving the electric motor 13. Through such activation control of the inverter 19, the electric motor 13 is driven in a mode suitable for the operating condition of the vehicle 10.

Meanwhile, when the vehicle 10 is damaged by a collision or the like, there is a possibility that a current leakage may occur in the electrical circuit including the electric motor 13, the drive unit 17, and the storage battery 20. In a hybrid vehicle mounted with an internal combustion engine and an electric motor as vehicle driving sources, because the voltage to be applied to the electrical circuit is likely to be high, it is desirable to suppress current leakage from the electrical circuit. Therefore, in the present embodiment, in order to suppress current leakage, breakers 25 for cutting off, at the time of a collision of the vehicle 10, a connection of the storage battery 20 with the drive unit 17, particularly, with a drive circuit 30 that drives the electric motor 13, are provided. When a collision of the vehicle 10 is detected, the breakers 25 are activated based on an output signal from the collision sensor 24. Accordingly, an electric power supply from the storage battery 20 to the drive circuit 30 is stopped.

The drive unit 17 includes the capacitor 37. When the drive unit 17 is activated as a result of electric power being supplied from the storage battery 20, charge is accumulated in the capacitor 37. Therefore, even if the breakers 25 are activated to stop an electric power supply from the storage battery 20 to the drive unit 17, potential of the drive circuit 30 is maintained in an unnecessarily high state. In that regard, in the present embodiment, when a collision of the vehicle 10 is detected, the breakers 25 are activated to stop an electric power supply from the storage battery 20, and a resistance for discharge, specifically, a resistance connecting device 50 to be described later, is connected in parallel with respect to the capacitor 37. Accordingly, because the charge that has been accumulated in the capacitor 37 is discharged by the discharge resistance, the potentials of respective portions of the drive circuit 30 are no longer maintained in an unnecessarily high state.

As the resistance connecting device 50 for connecting a resistance for discharge to the capacitor 37, a device including a low-explosive type actuator that is activated when a collision of the vehicle 10 has been detected is employed. The resistance connecting device 50 is driven by activation of the low-explosive type actuator.

Figure 3:
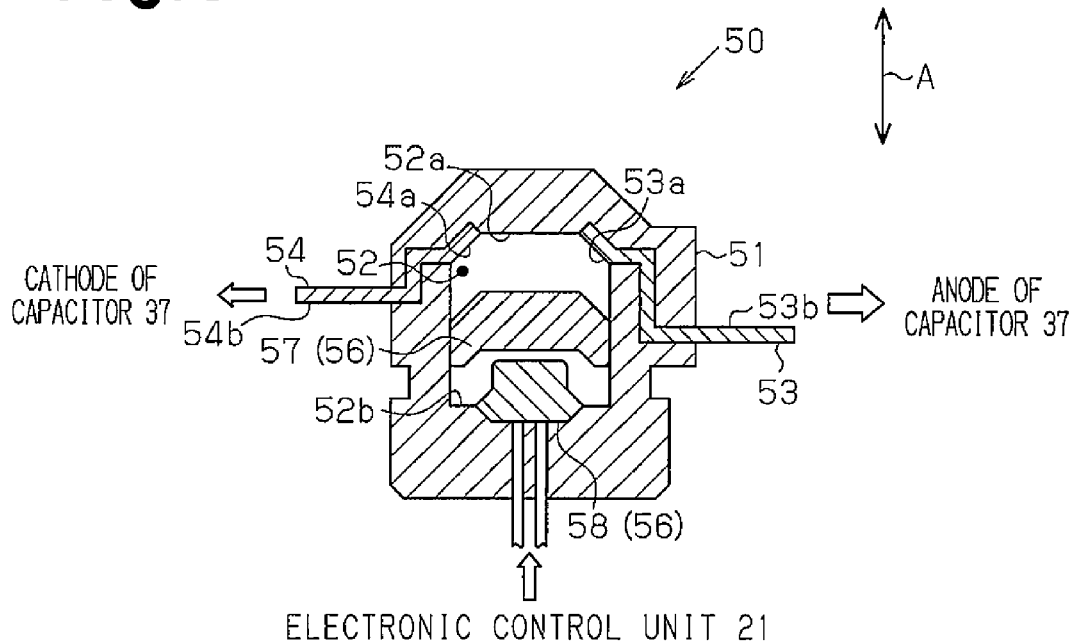
FIG. 3 is a sectional view of the resistance connecting device before activation of an actuator.
Figure 4:
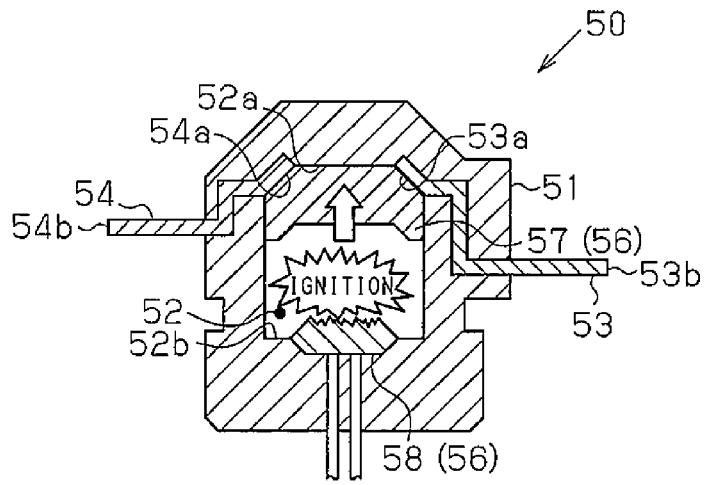
FIG. 4 is a sectional view of the resistance connecting device after activation of an actuator.

As shown in FIG. 3 and FIG. 4, the resistance connecting device 50 includes a case 51 inside of which a chamber 52 is formed. The chamber 52 is formed in a substantially columnar shape. The resistance connecting device 50 is provided with a pair of external connecting portions consisting of a first connecting portion 53 and a second connecting portion 54. The first and second connecting portions 53, 54 extend from the inside to the outside of the case 51 in a mutually separated state and connect the inside of the chamber 52 and the outside of the case 51. The first connecting portion 53 has a first contact 53a at an end portion to be located in the chamber 52. The second connecting portion 54 has a second contact 54a at an end portion to be located in the chamber 52. The first and second contacts 53a, 54a are exposed at an inner peripheral surface of the chamber 52, particularly, a top portion 52a of the chamber 52. The top portion 52a is located at an end portion in the axial direction (direction shown by the arrow A in FIG. 3) of the chamber 52.

As shown in FIG. 3, the first connecting portion 53 has a first external terminal 53b at an end portion to be located outside of the case 51. The first external terminal 53b is connected to an anode of the capacitor 37, particularly, the vicinity of an anode of the capacitor 37 of the drive circuit 30. The second connecting portion 54 has a second external terminal 54b at an end portion to be located outside of the case 51. The second external terminal 54b is connected to a cathode of the capacitor 37. Particularly, the second external terminal 54b is connected to a site which is a grounding site 39 of the drive circuit 30 and to be connected to a negative electrode of the storage battery 20 in the converter 18. The resistance connecting device 50 is attached to the drive circuit 30 connected with the capacitor 37 and is connected in parallel with respect to the capacitor 37.

The resistance connecting device 50 includes the low-explosive type actuator 56. The actuator 56 includes an activating unit 57 and a gas generating unit 58. The actuating unit 57 is formed in a substantially columnar shape and located in the chamber 52. The gas generating unit 58 generates gas as a result of a signal input from the electronic control unit 21. The gas generating unit 58 is located between a bottom portion 52b of the chamber 52 and the activating unit 57, that is, behind the activating unit 57 in the moving direction thereof. The gas generating unit 58 is attached to the bottom portion 52b of the chamber 52. The bottom portion 52b is located at an end portion in the axial direction of the chamber 52. When the gas generating unit 58 is activated, the powder in the gas generating unit 58 ignites to burn. The activating unit 57 is pressured by combustion gas to move inside the chamber 52 from the bottom portion 52b toward the top portion 52a. Generally, a low-explosive type actuator is activated more quickly than an electromagnetic actuator, is low in cost, and has high operation reliability.

Hereinafter, an operating mode of the resistance connecting device 50 will be described with reference to FIG. 3 and FIG. 4.

The resistance connecting device 50 is activated as in the following according to whether there is a collision detected by the collision sensor 24. FIG. 3 shows the resistance connecting device 50 when a collision of the vehicle 10 has not been detected and the actuator 56 has not been activated. As shown in FIG. 3, the activating unit 57 is held at a first position that does not cause contact with either of the first contact 53a and the second contact 54a. At this time, the first contact 53a and the second contact 54a are not connected, so that the anode and cathode of the capacitor 37 are not connected.

FIG. 4 shows the resistance connecting device 50 when a collision of the vehicle 10 has been detected and the actuator 56 has been activated. As shown in FIG. 4, the activating unit 57 moves up to a second position that causes contact with both of the first contact 53a and the second contact 54a. The activating unit 57 is made of a conductive material, and specifically, formed of engineering plastic. Particularly, the activating unit 57 is made of a resin material that has been adjusted to a predetermined electrical resistance by mixing with a conductivity-imparting agent. The activating unit 57, at the second position, functions as a resistor having a predetermined electrical resistance and connects the first contact 53a and the second contact 54a. The shape and material of the activating unit 57 is set to satisfy the specifications described above.

After activation of the actuator 56, the first contact 53a and the second contact 54a of the resistance connecting device 50, particularly, the anode and cathode of the capacitor 37 are connected with each other via the activating unit 57 having a predetermined electrical resistance. The activating unit 57 functions as a resistor connected between the anode and cathode of the capacitor 37, that is, as a resistance for discharge. Accordingly, charge accumulated in the capacitor 37 is forcibly discharged via the activating unit 57. Therefore, the potentials of respective portions of the drive circuit 30 fall. The above-described predetermined electrical resistance is set to a resistance value that allows fully discharging charge accumulated in the capacitor 37 in a desired time, for example, a few minutes.

Thus, the activating unit 57 functions as a resistor having a predetermined electrical resistance. The activating unit 57 is in a state in which the activating unit 57 does not connect the respective contacts 53a, 54a before activation of the actuator 56 and reaches a state in which the activating unit 57 electrically connects the respective contacts 53a, 54a after activation of the actuator 56. That is, the activating unit 57 is used as a movable section of a switch that forcibly connects a device functioning as a resistor to the drive circuit 30. Moreover, the activating unit 57 is also used as a device itself functioning as a resistor. Consequently, as compared with a device of a comparative example in which a switch and a device functioning as a resistor are separately provided, the structure of the resistance connecting device 50 is simplified.

Moreover, when the moving direction (up-down direction in FIG. 3 and FIG. 4) of the activating unit 57 is set as a front-rear direction, the outer surface shape of a front portion of the activating unit 57 is formed as a tapered shape to taper off toward the front. Moreover, the inner surface shape of a part that makes contact with a front portion of the activating unit 57 after the activating unit 57 moves, that is, the vicinity of the top portion 52a of the chamber 52 is also the same as the outer surface shape of the front portion of the activating unit 57. That is, the inner surface shape of the vicinity of the top portion 52a of the chamber 52 is also formed as a tapered shape to taper off toward the front along the moving direction of the activating unit 57. Moreover, the first contact 53a and the second contact 54a are both exposed along the inner surface and conform to a tapered shape of the chamber 52. Therefore, the interval between the first contact 53a and the second contact 54a becomes narrower toward the front of the chamber 52 and in the moving direction of the activating unit 57.

In the resistance connecting device 50, when the activating unit 57 moves as a result of activation of the actuator 56, the front portion in the moving direction of the activating unit 57 is fitted in a recess portion in the vicinity of the top portion 52a of the chamber 52 and fitted between the first contact 53a and the second contact 54a. Therefore, the contact pressure of a contact part between the activating unit 57 and the first contact 53a and the contact pressure of a contact part between the activating unit 57 and the second contact 54a are both high. Hence, the first contact 53a and the second contact 54a are reliably connected via the activating unit 57.

As above, according to the present embodiment, the following effects can be obtained.

(1) The activating unit 57, when the actuator 56 has not been activated, is held at the first position that does not cause contact with either of the first contact 53a and the second contact 54a. As a result of actuation of the actuator 56, the activating unit 57 moves up to the second position that causes contact with both of the first contact 53a and the second contact 54a. Moreover, the activating unit 57, at the second position, functions as a resistor having a predetermined electrical resistance and connects the first connecting portion 53 and the second connecting portion 54. That is, the activating unit 57 is used as a movable section of a switch that forcibly connects a device functioning as a resistor to the drive circuit 30. Moreover, the activating unit 57 is also used as a device itself functioning as a resistor. Consequently, as compared with a device of a comparative example in which a switch and a device functioning as a resistor are separately provided, the structure of the resistance connecting device 50 can be simplified.

(2) The resistance connecting device 50 is attached to the drive circuit 30 connected with the capacitor 37 and is connected in parallel with respect to the capacitor 37. Therefore, when the actuator 56 is activated when a collision of the vehicle 10 has been detected, the activating unit 57 functioning as a discharge resistance is connected in parallel with respect to the capacitor 37. Accordingly, charge accumulated in the capacitor 37 is forcibly discharged, so that the potentials of respective portions of the drive circuit 30 can be caused to fall to appropriate values.

(3) For the vehicle 10 mounted with the electric motor 13 for traveling, it has been demanded to suppress a current leakage from the drive circuit 30. According to the present embodiment, as a result of charge accumulated in the capacitor 37 being forcibly discharged, the potentials of respective portions of the drive circuit 30 can be caused to fall to appropriate values.

(4) To the capacitor 37, an output voltage of the converter 18 is applied. According to the present embodiment, charge accumulated in the capacitor 37 can be appropriately discharged.

(5) The outer surface shape of the front portion of the activating unit 57 is formed as a tapered shape to taper off toward the front. Moreover, the inner surface shape of the vicinity of the top portion 52a that makes contact with the front portion of the activating unit 57 after a movement of the activating unit 57 is also the same as the outer surface shape of the front portion of the activating unit 57. According to this arrangement, after activation of the actuator 56, the contact pressure of a contact part between the activating unit 57 and the first contact 53a and the contact pressure of a contact part between the activating unit 57 and the second contact 54a can both be high. Hence, the first contact 53a and the second contact 54a are reliably connected via the activating unit 57. Consequently, the first connecting portion 53 and the second connecting portion 54 are reliably connected via the activating unit 57.

In addition, the present embodiment can be modified as in the following.

As long as the activating unit 57 is held at a position that causes contact with both of a pair of external connecting portions after activation of the actuator 56, the outer surface shape of the front portion of the activating unit 57 and the inner surface shape of the vicinity of the top portion 52a with which the front portion of the activating unit 57 makes contact after the activating unit 57 moves may not be formed as tapered shapes.

Alternatively, a latching member may be provided inside of the chamber 52, and the latching member may be formed such that it is not caught on the activating unit 57 that moves forward but is caught on the activating unit 57 that moves rearward. In this case, after activation of the actuator 56, the activating unit 57 is engaged with the latching member, so that the activating unit 57 is held at a position to which the activating unit 57 has moved.

Alternatively, a recess portion may be provided in either one of the front portion of the activating unit 57 and the top portion 52a of the chamber 52, and a projection portion may be provided in the other. In this case, as a result of the recess and projection portions being fitted with each other, the activating unit 57 is held at a position to which the activating unit 57 has moved.

The shapes of the chamber 52, the activating unit 57, the first connecting portion 53, and the second connecting portion 54 may be changed to arbitrary shapes. It is sufficient if the activating unit 57 is held at the first position in which the activating unit 57 does not make contact with either of the first contact 53a and the second contact 54a when the actuator 56 has not been activated and is moved to the second position in which the activating unit 57 makes contact with both of the first contact 53a and the second contact 54a as a result of activation of the actuator 56.

The activating unit 57 may be formed of a material other than a resin material, for example, a metal material. It suffices that the activating unit 57 can function as a resistor having a predetermined electrical resistance after activation of the actuator 56 and connecting a pair of external connecting portions.

The present invention may be applied not only to an electrical circuit to be mounted on a vehicle but also to an electrical circuit of equipment installed in a factory. In this case, it suffices that an abnormality of the electrical circuit itself, an abnormality of the equipment, or the like can be detected, and based on the detection, both the stopping of an electric power supply from the power supply to the electrical circuit and forced discharge of charge accumulated in the capacitor can be performed.

The present invention may be applied not only to an electrical circuit to which a storage battery is connected as a power supply, but also to an electrical circuit to which a commercial power supply is connected as a power supply.

The invention claimed is:

1. A resistance connecting device comprising:
   a case inside of which a chamber is formed;
   a movable member that is movable in the chamber;
   a gas generating unit provided on a back side of the movable member within the chamber and, as a result of an external signal, wherein the gas generating unit is activated to generate gas; and
   a pair of external connecting portions extending from an inside to an outside of the case in a mutually separated state, located at different positions in the chamber, and respectively exposed at a front side of the chamber, wherein
   the movable member is made of a resin material admixed with a conductivity-imparting agent in an amount providing the movable member with a predetermined electrical resistance corresponding to a resistor,
   the movable member is held at a first position in which the movable member is out of contact with at least one of the pair of external connecting portions when the gas generating unit has not been activated and moves to a second position to cause contact with both of the external connecting portions as a result of activation of the gas generating unit, and
   the movable member, at the second position, functions as a resistor having a predetermined electrical resistance and connects the external connecting portions to one another.

2. The resistance connecting device according to claim 1, wherein
   the resistance connecting device is attached to an electrical circuit connected in parallel with a capacitor, and
   the movable member functions as a discharge resistance to forcibly discharge charge that has accumulated in the capacitor.

3. The resistance connecting device according to claim 2, wherein
   the electrical circuit includes a traveling electric motor for a vehicle and a drive circuit for driving the traveling electric motor.

4. The resistance connecting device according to claim 2, wherein
   the electrical circuit includes a converter circuit that boosts a power supply voltage, and
   to the capacitor, an output voltage of the converter circuit is applied.

5. The resistance connecting device according to claim 1, wherein
   a front portion of the movable member and an inner surface of the chamber that makes contact with the front portion of the movable member after movement of the movable member are formed in tapered shapes that narrow in the moving direction of the movable member.

6. The resistance connecting device according to claim 1, wherein
   the external connecting portions are connected respectively to an anode and a cathode of a capacitor, and
   the predetermined electrical resistance is set to a resistance value that discharges charge accumulated in the capacitor.

7. A resistance connecting device comprising:

a case and a chamber contained within the case;

a movable member moving between a first position and a second position in the chamber, the movable member consisting essentially of a resin material admixed with an amount of a conductivity-imparting agent sufficient to provide the movable member with a predetermined electrical resistance corresponding to a resistor;

a gas generating unit provided on a back side of the movable member within the chamber between the first and second positions, the gas generating unit being activated upon receipt of a signal input from an external source and generating gas upon being activated; and a pair of external connecting portions extending from the chamber within the case to an outside of the case in a mutually separated state, the pair of external connecting portions being located at different positions in the chamber respectively and being exposed at a front side of the chamber, wherein in the first position the movable member is held out of contact with at least one of the pair of external connecting portions, in the second position the movable member is maintained in contact with both of the external connecting portions and the movable member operates as a resistor connecting the external connecting portions together, and the movable member is initially in the first position and is moved to the second position by gas generated as the gas generating unit is activated.

8. The resistance connecting device according to claim 7, wherein the resistance connecting device is attached to an electrical circuit connected in parallel with a capacitor, and the movable member operates as a discharge resistance to forcibly discharge a charge that has accumulated in the capacitor.

9. The resistance connecting device according to claim 8, wherein the electrical circuit includes a traveling electric motor for a vehicle and a drive circuit for driving the traveling electric motor.

10. The resistance connecting device according to claim 8, wherein the electrical circuit includes a converter circuit that boosts a power supply voltage and an output voltage of the converter circuit is applied to the capacitor.

11. The resistance connecting device according to claim 7, wherein a front portion of the movable member and an inner surface of the chamber that makes contact with the front portion of the movable member after movement of the movable member are formed in tapered shapes that narrow in a moving direction of the movable member.

12. The resistance connecting device according to claim 7, wherein the external connecting portions are connected respectively to an anode and a cathode of a capacitor, and the predetermined electrical resistance is set to a resistance value that discharges charge accumulated in the capacitor.

* * * * *